United States Patent
Mizushima et al.

(10) Patent No.: US 8,920,880 B2
(45) Date of Patent: Dec. 30, 2014

(54) METHOD FOR PRODUCING AIR BAG BASE FABRIC, AND AIR BAG BASE FABRIC

(75) Inventors: Hidenori Mizushima, Annaka (JP); Shigeru Ubukata, Annaka (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 0 days.

(21) Appl. No.: 13/884,020

(22) PCT Filed: Jan. 30, 2012

(86) PCT No.: PCT/JP2012/052571
§ 371 (c)(1),
(2), (4) Date: May 8, 2013

(87) PCT Pub. No.: WO2012/111460
PCT Pub. Date: Aug. 23, 2012

(65) Prior Publication Data
US 2013/0225024 A1 Aug. 29, 2013

(30) Foreign Application Priority Data

Feb. 15, 2011 (JP) .................. 2011-029422

(51) Int. Cl.
| | | |
|---|---|---|
| *B05D 3/00* | (2006.01) | |
| *D06N 3/12* | (2006.01) | |
| *C09D 183/04* | (2006.01) | |
| *D06M 11/79* | (2006.01) | |
| *D06M 15/643* | (2006.01) | |
| *D06M 15/65* | (2006.01) | |
| *D06M 15/693* | (2006.01) | |
| *C08G 77/12* | (2006.01) | |
| *C08G 77/20* | (2006.01) | |
| *C08K 3/36* | (2006.01) | |
| *C08K 5/5435* | (2006.01) | |
| *D06M 101/32* | (2006.01) | |
| *D06M 101/34* | (2006.01) | |
| *D06M 101/36* | (2006.01) | |

(52) U.S. Cl.
CPC .............. *D06N 3/128* (2013.01); *C09D 183/04* (2013.01); *D06M 11/79* (2013.01); *D06M 15/643* (2013.01); *D06M 15/65* (2013.01); *D06M 15/693* (2013.01); *C08G 77/12* (2013.01); *C08G 77/20* (2013.01); *C08K 3/36* (2013.01); *C08K 5/5435* (2013.01); *C08L 2205/02* (2013.01); *D06M 2101/32* (2013.01); *D06M 2101/34* (2013.01); *D06M 2101/36* (2013.01); *D06N 2211/268* (2013.01)
USPC ......... 427/386; 427/387; 427/407.1; 427/412

(58) Field of Classification Search
None
See application file for complete search history.

(56) References Cited

U.S. PATENT DOCUMENTS

| | | |
|---|---|---|
| 3,642,518 A | 2/1972 | Miki et al. |
| 5,254,621 A | 10/1993 | Inoue et al. |
| 5,877,256 A | 3/1999 | Nakamura et al. |
| 6,140,414 A | 10/2000 | Ohsawa et al. |
| 6,387,520 B1 | 5/2002 | Fujiki et al. |
| 8,058,190 B2 * | 11/2011 | Sweet et al. .................. 442/149 |
| 2002/0082377 A1 * | 6/2002 | Bohin et al. .................... 528/15 |
| 2005/0129919 A1 | 6/2005 | Michiels |
| 2006/0194007 A1 * | 8/2006 | Ishii et al. .................... 428/34.3 |
| 2008/0085942 A1 * | 4/2008 | Jackson et al. ............... 521/47.5 |
| 2009/0001690 A1 * | 1/2009 | Ikeno et al. ................ 280/728.1 |

FOREIGN PATENT DOCUMENTS

| | | |
|---|---|---|
| EP | 2 009 059 A2 | 12/2008 |
| JP | 5-25435 A | 2/1993 |
| JP | 5-98579 A | 4/1993 |
| JP | 5-214295 A | 8/1993 |
| JP | 2000-34410 A | 2/2000 |
| JP | 2002-138249 A | 5/2002 |
| JP | 3945082 B2 | 7/2007 |
| JP | 2009-242536 A | 10/2009 |
| JP | 2010-84081 A | 4/2010 |

OTHER PUBLICATIONS

International Search Report, mailed Jul. 19, 2012, issued in PCT/JP2012/052571.
Written Opinion of the International Searching Authority, mailed Jul. 19, 2012, issued in PCT/JP2012/052571.

* cited by examiner

*Primary Examiner* — Erma Cameron
(74) *Attorney, Agent, or Firm* — Birch, Stewart, Kolasch & Birch, LLP

(57) ABSTRACT

A method for producing an air bag base fabric which has a silicone rubber coating layer on at least one surface of a substrate is provided. The silicone rubber coating layer is prepared by curing a liquid silicone rubber coating composition having the low viscosity required in the coating and excellent adhesion to the air bag base fabric. An air bag base fabric produced by this method is also provided. In this method, an air bag base fabric is produced by preliminarily treating at least one surface of the textile fabric with an organosilicon compound containing an epoxy group and an alkoxy group bonded to a silicon atom in one molecule to prepare a substrate fabric containing about 0.01 to 5 parts by weight of the organosilicon compound, and coating and curing the liquid silicone rubber coating composition of particular formulation on the substrate.

5 Claims, No Drawings

METHOD FOR PRODUCING AIR BAG BASE FABRIC, AND AIR BAG BASE FABRIC

This application is the National Stage filing under 35 U.S.C. 371 of PCT application No. PCT/JP2012/052571, filed Jan. 30, 2012, which claims benefit to JP2011-029422, filed Feb. 15, 2011.

TECHNICAL FIELD

This invention relates to a method for producing an air bag base fabric having a silicone rubber coating layer formed on at least one surface of a substrate comprising a textile fabric, and an air bag base fabric produced by such method. More specifically, this invention relates to a method for producing an air bag base fabric comprising a textile fabric of, for example, 6,6 nylon, 6 nylon, or polyester having a silicone rubber coating formed thereon which is adapted for use in a car air bag, and in particular, in the air bag mounted on the driver's and passenger's seats of a vehicle and the curtain air bag accommodated along the front pillar and the roof side that should retain the inflated state for a predetermined period for head protection and prevention of being thrown out of the car in the collision and roll-over accidents; as well as an air bag base fabric produced by such method.

BACKGROUND ART

An air bag has been developed as an air bag system for reducing impact of the collision on the side of a vehicle and prevention of a driver from being thrown out of the car in the roll-over accidents. In the actual operation, the air bag should retain gas pressure (internal pressure) caused by the explosion of the inflating agent for a predetermined period, and a coating composition exhibiting lower viscosity and stronger adhesion compared to the conventional coating composition is required.

Various silicone rubber compositions for air bag have been used for the purpose of forming a rubber coating on the textile surface.

For example, Japanese Patent No. 3945082 discloses a coating composition only containing wet silica, and JP-A H05-25435 discloses, an organosilicon compound containing epoxy group. JP-A H05-98579 discloses a coating composition containing an organosilicon compound having isocyanate group as an adhesive component, and JP-A H05-214295 discloses a silicone rubber composition for air bag prepared by mixing an addition curable composition containing an inorganic filler, a siloxane resin, and an epoxy group-containing silicon compound, which exhibits good adhesion to the base fabric. JP-A 2002-138249 discloses a silicone rubber composition for air bag prepared by adding an inorganic filler, a siloxane resin, an organotitanium compound, and an alkyl silicate to an addition curable composition, which exhibits excellent adhesion to the base fabric when cured by heating for a short period.

However, when used for air bags, these compositions were not satisfactory in the low viscosity and adhesion to the air bag base fabric required in the coating of the air bag.

SUMMARY OF THE INVENTION

Problems to be Solved by the Invention

The present invention has been completed in view of such situation, and an object of the present invention is to provide a method for producing an air bag base fabric having a silicone rubber coating layer on one surface of a substrate by forming and curing a liquid silicone rubber coating composition which has the low viscosity and strong adhesion to the air bag base fabric required in the coating of the air bag.

Another object of the present invention is to provide an air bag base fabric produced by such production method.

Means for Solving the Problems

In order to achieve the objects as described above, the inventors of the present invention made an intensive investigation and found that an air bag base fabric having a silicone rubber coating layer on at least one surface of the substrate can be produced by preliminarily treating at least one surface of a textile fabric with an organosilicon compound (F) containing an epoxy group and an alkoxy group bonded to silicon atoms in one molecule to prepare a substrate which is an air bag textile fabric containing about 0.01 to 5 parts by weight of the organosilicon compound, coating the at least one treated surface of the substrate with a liquid silicone rubber coating composition having a particular formulation, and curing the composition to form a silicone rubber coating layer on at least one surface of the substrate; and that the air bag produced by using such air bag base fabric exhibits suppressed leakage of the inflator gas and the inflated state of the air bag is retained for a certain period. The present invention has been achieved based on such findings.

Accordingly, the present invention provides a method for producing an air bag base fabric comprising the steps of
preliminarily treating at least one surface of a textile fabric with
(F) an organosilicon compound containing an epoxy group and an alkoxy group bonded to a silicon atom in one molecule to prepare a substrate which is an air bag textile fabric containing 0.01 to 5 parts by weight of the organosilicon compound in relation to 100 parts by weight of the textile fabric before the treatment,
coating the at least one treated surface of the substrate with a liquid silicone rubber coating composition comprising
(A) 100 parts by weight of an organopolysiloxane containing at least 2 alkenyl groups bonded to silicon atoms per molecule,
(B) an organohydrogenpolysiloxane containing at least 2 hydrogen atoms bonded to silicon atoms in one molecule at an amount such that the number of the hydrogen atoms bonded to the silicon atoms in this component is 1 to 10 per one alkenyl group bonded to the silicon atom in the component (A),
(C) an effective amount of an addition catalyst,
(D) 0 to 50 parts by weight of a fine powder silica having a specific surface area of at least 50 m$^2$/g, and
(E) 0.01 to 5 parts by weight of an organometallic compound selected from titanium compounds and zirconium compounds, and
curing the composition to form a silicone rubber coating layer on at least one surface of the substrate.

The textile fabric preferably comprises a synthetic fiber selected from polyamide fiber, polyester fiber, and alamid fiber. The organosilicon compound (F) containing an epoxy group and an alkoxy group bonded to a silicon atom in one molecule is preferably a silane or a cyclic or straight chain organosiloxane containing 2 to 120 silicon atoms and containing at least 1 epoxy group and at least 2 alkoxy groups bonded to the silicon atom. Furthermore, the liquid silicone rubber coating composition preferably has a viscosity at 25° C. of up to 50 Pa·s.

The present invention also provides an air bag base fabric produced by the method as described above, and having a silicone rubber coating layer formed by curing the liquid silicone rubber coating composition on at least one surface of the substrate comprising a textile fabric.

Advantageous Effect of the Invention

The present invention is capable of producing an air bag base fabric which has a silicone rubber coating layer on at least one surface of a substrate, wherein the silicone rubber coating layer is prepared by curing a liquid silicone rubber coating composition which exhibits low viscosity required in the coating of the air bag and excellent adhesion of the coating to the air bag base fabric. In addition, the air bag produced by using the air bag base fabric produced by this method exhibits suppressed leakage of the inflator gas as well as sufficient inflated period.

EMBODIMENT FOR CARRYING OUT THE INVENTION

The method for producing an air bag base fabric of the present invention comprises the steps of preliminarily treating at least one surface of a textile fabric with component (F) as described below to prepare a substrate which is an air bag textile fabric, coating the at least one treated surface of the substrate with a liquid silicone rubber coating composition comprising component (A) to (E) as will be described below, and curing the composition to thereby form a silicone rubber coating layer on at least one surface of the substrate.

The air bag base fabric produced by the production method of the present invention is adapted for use in an air bag, and in particular, a curtain air bag. The air bag produced by using the air bag base fabric produced by the method of the present invention may be the one having a known constitution, for example, a plain weave type air bag prepared by adhering periphery of 2 plain weave base fabrics having a rubber coating on the interior side of the bag with an adhesive, and sewing the periphery of the bag through the adhesive layer; or a tube weave type air bag having the bag structure formed by weaving.

The textile fabric which is preliminarily treated by the component (F) may be any of the known base fabrics which are used for air bags, and examples include synthetic fibers such as 6,6 nylon, 6 nylon, polyester fiber, alamid fiber, various polyamide fibers, and various polyester fibers.

The component (F) is a component used for preliminary surface treatment of at least one surface of the textile fabric used for the substrate of the air bag base before the treatment with the liquid silicone rubber coating composition containing the components (A) to (E) as will be described below.

The component (F) is an organosilicon compound containing an epoxy group and an alkoxy group bonded to a silicon atom in one molecule, and the organosilicon compound used is not particularly limited as long as it contains an epoxy group and an alkoxy group bonded to a silicon atom in one molecule. In view of realizing the adhesion, the organosilicon compound is preferably an organosilicon compound containing at least 1 epoxy group and at least 2 alkoxy groups bonded to the silicon atoms, for example, an organosilicon compound such as a silane or a cyclic or straight chain siloxane containing 2 to 120 silicon atoms, preferably 2 to 30 silicon atoms, and more preferably 4 to 20 silicon atoms.

The epoxy group is preferably bonded to the silicon atom as a glycidoxyalkyl group such as glycidoxypropyl group or as an epoxy group-containing cyclohexylalkyl group such as 2,3-epoxycyclohexylethyl group or 3,4-epoxycyclohexylethyl group. The alkoxy group bonded to the silicon atom is preferably a trialkoxysilyl group such as trimethoxysilyl group, triethoxysilyl group, methyldimethoxysilyl group, ethyldimethoxysilyl group, methyldiethoxysilyl group, or ethyldiethoxysilyl group or an alkyldialkoxysilyl group.

The component (F) may also be an organosilicon compound containing a functional group other than the epoxy group and the alkoxy group bonded to the silicon atom in one molecule. The functional group other than the epoxy group and the alkoxy group may be at least one group selected from alkenyl groups such as vinyl group, (meth)acryloxy group, and hydrosilyl group (SiH group).

Examples of the organosilicon compound of the component (F) include the organosilicon compounds represented by the following chemical formulae:

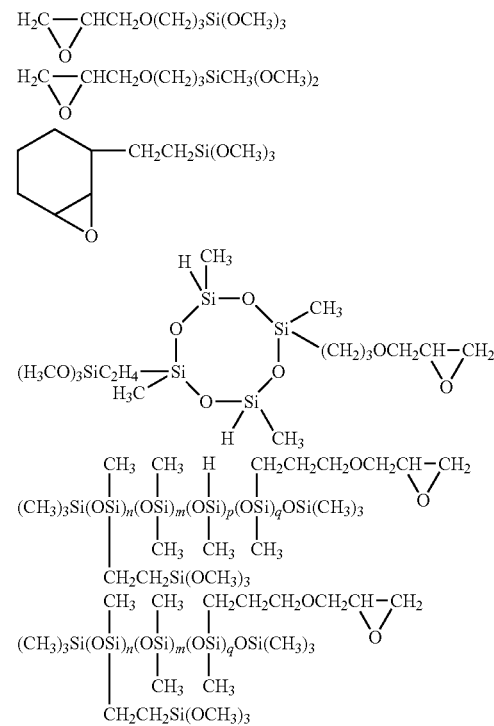

wherein n is an integer of 1 to 10, m is an integer of 0 to 100, and preferably 0 to 20, p is an integer of 1 to 100, and preferably 1 to 20, and q is an integer of 1 to 10; a mixture of two or more of such compounds; and a partial hydrolytic condensate of one or two or more of such compounds.

The component (F) may be used at an amount of 0.01 to 5 parts by weight, and preferably 0.1 to 5 parts by weight in relation to 100 parts by weight of the textile fabric before the treatment. When used at an amount of less than 0.01 part by weight, the cured product of the liquid silicone rubber coating composition comprising the components (A) to (E) as described below will not exhibit sufficient adhesion to the substrate comprising the air bag textile fabric having at least one surface thereof surface treated with the component (F), and amount in excess of 5 parts by weight results in the loss of the physical properties of the cured product obtained from the composition. Accordingly, the treated textile fabric should contain the component (F) at an amount of about 0.01 to 5% by weight, and in particular, at 0.01 to 4.76% by weight in relation to the entire textile fabric.

The application of the component (F) to the textile fabric may be conducted, for example, by

[1] immersing the yarn in the aqueous solution of the component (F), and after drying the yarn at an elevated temperature, preparing the treated textile fabric by using the treated yarn,

[2] directly spraying the component (F) to at least one surface (namely, one side or both sides) of the textile fabric and heating the fabric to thereby produce the treated textile fabric, or

[3] immersing the textile fabric in the aqueous solution of the component (F) and drying the coating at an elevated temperature to thereby prepare the treated textile fabric.

However, the present invention is not limited to these methods as long as about 0.01 to 5% by weight of the component (F) is present in the textile fabric (or 0.01 to 5 parts by weight in relation to 100 parts by weight of the textile fabric before the treatment).

When the component (F) is used as an aqueous solution, the aqueous solution is preferably a 0.01 to 5% by weight, and in particular, a 0.1 to 2% by weight aqueous solution so that the weight of the aqueous solution is the same as the weight of textile fabric in view of the workability.

The heating (drying) is preferably at 100 to 200° C., and in particular, at 120 to 180° C. for 0.1 to 10 minutes, and in particular, for 0.5 to 5 minutes since moisture should be removed to prepare the treated textile fabric containing the component (F).

The liquid silicone rubber coating composition used for the formation of the silicone rubber coating layer on the at least one treated surface of the substrate comprising a surface treated textile fabric comprises:

(A) an organopolysiloxane containing at least 2 alkenyl groups bonded to the silicon atoms per molecule, (B) an organohydrogenpolysiloxane containing at least 2 hydrogen atoms bonded to the silicon atoms per molecule, (C) an addition catalyst, (D) a fine powder silica having a specific surface area of at least 50 m²/g, and (E) an organometallic compound selected from titanium compounds and zirconium compounds.

The organopolysiloxane of the component (A) is the base polymer of this composition, and contains at least 2, typically 2 to 50, and preferably 2 to about 20 alkenyl group bonded to the silicon atoms in one molecule. Preferably, the organopolysiloxane used is the one represented by the following average compositional formula (1):

$$R_a SiO_{(4-a)/2} \quad (1)$$

wherein R is independently a substituted or unsubstituted monovalent hydrocarbon group containing 1 to 10, and preferably 1 to 8 carbon atoms, a is a positive number in the range of 1.5 to 2.8, preferably 1.8 to 2.5, more preferably 1.95 to 2.05, and most preferably 1.98 to 2.01.

Examples of the alkenyl group bonded to the silicon atom in the component (A) (R in the formula (1)) include those containing 2 to 8, and preferably 2 to 4 carbon atoms such as vinyl group, allyl group, propenyl group, isopropenyl group, butenyl group, isobutenyl group, pentenyl group, hexenyl group, cyclohexenyl group, and heptenyl group, and the particularly preferred is vinyl group.

Position of the silicon atom having the alkenyl group bonded thereto in the polysiloxane skeleton of the component (A) may be, for example, the end of the molecular chain and/or the midst of the molecular chain (not at the end of the molecular chain). The component (A) is preferably a straight chain diorganopolysiloxane containing at least an alkenyl group bonded to the silicon atom at opposite ends of the molecular chain.

The content of the alkenyl group in the component (A) is preferably 0.001 to 10% by mole, and in particular, 0.01 to 5% by mole in relation to all of the monovalent organic group bonded to the silicon atom (namely, substituted or unsubstituted monovalent hydrocarbon group represented by R in the average compositional formula (1)).

Examples of the organic group other than the alkenyl group bonded to the silicon atom in the component (A) (R in the formula (1)) include unsubstituted or halogen-substituted monovalent hydrocarbon groups containing 1 to 12 carbon atoms, and preferably 1 to 10 carbon atoms including alkyl groups such as methyl group, ethyl group, propyl group, isopropyl group, butyl group, isobutyl group, tert-butyl group, pentyl group, hexyl group, cyclohexyl group, and heptyl group; aryl groups such as phenyl group, tolyl group, xylyl group, and naphthyl group; aralkyl groups such as benzyl group and phenethyl group; and halogenated alkyl groups such as chloromethyl group, 3-chloropropyl group, and 3,3,3-trifluoropropyl group. The preferred are methyl group and phenyl group.

The component (A) as described above may have a molecular structure such as straight chain, cyclic, branched, or three dimensional network structure, and the component (A) is preferably a straight chain diorganopolysiloxane having opposite ends of the molecular chain capped with triorganosiloxy group wherein the backbone basically comprises repetition of a diorganosiloxane unit. (The organo group may be an alkenyl group).

The component (A) may have a viscosity at 25° C. in the range of 100 to 100,000 mPa·s, and more preferably 300 to 50,000 mPa·s in view of the favorable physical properties of the resulting silicone rubber and good workability of the composition. In the present invention, the viscosity is measured by a rotary viscometer (and this applies to the following description).

Examples of the organopolysiloxane of the component (A) include dimethylsiloxane-methylvinylsiloxane copolymer having opposite ends of the molecular chain capped with trimethylsiloxy group, methylvinylpolysiloxane having opposite ends of the molecular chain capped with trimethylsiloxy group, dimethylsiloxane-methylvinylsiloxane-methylphenylsiloxane copolymer having opposite ends of the molecular chain capped with trimethylsiloxy group, dimethylsiloxane-methylvinylsiloxane-diphenylsiloxane copolymer having opposite ends of the molecular chain capped with trimethylsiloxy group, dimethylpolysiloxane having opposite ends of the molecular chain capped with dimethylvinylsiloxy group, methylvinylpolysiloxane having opposite ends of the molecular chain capped with dimethylvinylsiloxy group, dimethylsiloxane-methylvinylsiloxane copolymer having opposite ends of the molecular chain capped with dimethylvinylsiloxy group, dimethylsiloxane-methylvinylsiloxane-methylphenylsiloxane copolymer having opposite ends of the molecular chain capped with dimethylvinylsiloxy group, dimethylsiloxane-diphenylsiloxane copolymer having opposite ends of the molecular chain capped with dimethylvinylsiloxy group, dimethylsiloxane-methylphenylsiloxane copolymer having opposite ends of the molecular chain capped with dimethylvinylsiloxy group, dimethylsiloxane-methylvinylsiloxane-diphenylsiloxane copolymer having opposite ends of the molecular chain capped with dimethylvinylsiloxy group,
dimethylpolysiloxane having opposite ends of the molecular chain capped with divinylmethylsiloxy group,
dimethylsiloxane-methylvinylsiloxane copolymer having opposite ends of the molecular chain capped with divinylmethylsiloxy group,
dimethylpolysiloxane having opposite ends of the molecular chain capped with trivinylsiloxy group,
dimethylsiloxane-methylvinylsiloxane copolymer having opposite ends of the molecular chain capped with trivinylsiloxy group,
an organosiloxane copolymer consisting of a siloxane unit represented by the formula: $R^1_3SiO_{0.5}$, a siloxane unit represented by the formula: $R^1_2R^2SiO_{0.5}$, a siloxane unit represented by the formula: $R^1_2SiO$, and a siloxane unit represented by the formula: $SiO_2$,
an organosiloxane copolymer consisting of a siloxane unit represented by the formula: $R^1_2R^2SiO_{0.5}$ and a siloxane unit represented by the formula: $SiO_2$,
an organosiloxane copolymer consisting of a siloxane unit represented by the formula: $R^1_3SiO_{0.5}$, a siloxane unit represented by the formula: $R^1_2R^2SiO_{0.5}$, and a siloxane unit represented by the formula: $SiO_2$,
an organosiloxane copolymer consisting of a siloxane unit represented by the formula: $R^1_2R^2SiO_{0.5}$, a siloxane unit represented by the formula: $R^1_2SiO$, and a siloxane unit represented by the formula: $SiO_2$,
an organosiloxane copolymer consisting of a siloxane unit represented by the formula: $R^1R^2SiO$ and a siloxane unit represented by the formula: $R^1SiO_{1.5}$ or a siloxane unit represented by the formula: $R^2SiO_{1.5}$, and
mixtures of two or more such organopolysiloxane.

The $R^1$ in the formula may be a substituted or unsubstituted monovalent hydrocarbon group other than the alkenyl group, for example, those mentioned for the unsubstituted or halogen-substituted monovalent hydrocarbon group other then the alkenyl group of the organic group R. Examples include alkyl groups such as methyl group, ethyl group, propyl group, butyl group, pentyl group, hexyl group, cyclohexyl group, and heptyl group; aryl groups such as phenyl group, tolyl group, xylyl group, and naphthyl group; aralkyl groups such as benzyl group and phenethyl group; and halogenated alkyl groups such as chloromethyl group, 3-chloropropyl group, and 3,3,3-trifluoropropyl group. The $R^2$ in the formula may be an alkenyl group, for example, the one containing 2 to 8, and preferably 2 to 4 carbon atoms such as vinyl group, allyl group, propenyl group, isopropenyl group, isobutenyl group, cyclohexenyl group, butenyl group, pentenyl group, hexenyl group, and heptenyl group.

The alkenyl group-containing organopolysiloxane of the component (A) may comprise one type, or two or more types of the organopolysiloxane.

The organohydrogenpolysiloxane of the component (B) reacts with the component (A), and act as a crosslinking agent. The molecular structure is not particularly limited, and the conventional organohydrogenpolysiloxanes having straight chain, cyclic, branched, or three dimensional network (resin) structure can be used. However, the organohydrogenpolysiloxane should contain at least 2, and preferably at least 3 hydrogen atoms bonded to the silicon atoms (namely, hydrosilyl group represented by SiH) per molecule, and typically, 2 to 300, preferably 3 to 200, and more preferably 4 to 100 SiH groups per molecule.

The organohydrogenpolysiloxane may be the one represented by the following average compositional formula (2):

$$R^3_b H_c SiO_{(4-b-c)/2} \qquad (2)$$

In the formula (2), $R^3$ is a substituted or unsubstituted monovalent hydrocarbon group containing 1 to 10 carbon atoms bonded to the silicon atom excluding the aliphatic unsaturated bond. Examples of the substituted or unsubstituted monovalent hydrocarbon group of $R^3$ include alkyl groups such as methyl group, ethyl group, propyl group, isopropyl group, butyl group, isobutyl group, tert-butyl group, pentyl group, neopentyl group, hexyl group, cyclohexyl group, octyl group, nonyl group, and decyl group; aryl groups such as phenyl group, tolyl group, xylyl group, and naphthyl group; aralkyl groups such as benzyl group, phenylethyl group, and phenylpropyl group, and any of such groups having all or some of the hydrogen atoms substituted with a halogen atom such as fluorine, bromine, or chlorine, for example, halogen-substituted alkyl group such as chloromethyl group, chloropropyl group, bromoethyl group, and trifluoropropyl group. The substituted or unsubstituted monovalent hydrocarbon group $R^3$ is preferably an alkyl group or an aryl group, and more preferably, methyl group or phenyl group. b is 0.7 to 2.1 and c is 0.001 to 1.0 with the proviso that (b+c) is a positive number of 0.8 to 3.0; and preferably, b is 1.0 to 2.0 and c is 0.01 to 1.0 with the proviso that (b+c) is 1.5 to 2.5.

As described above, at least 2, and preferably at least 3 SiH groups are present per molecule, and this SiH group may be located at either or both of the end of the molecular chain and in the midst of the molecular chain. The organohydrogenpolysiloxane is not particularly limited for its molecular structure, and may have any of the straight chain, cyclic, branched, and three dimensional network structure. In addition, the organohydrogenpolysiloxane may preferably have the number of silicon atoms in one molecule (or the degree of polymerization) of typically about 2 to 300, preferably about 3 to 200, and more preferably about 4 to 150. Also, the organohydrogenpolysiloxane is liquid at temperature (25° C.), and may have a viscosity at 25° C. of typically about 0.1 to 1,000 mPa·s and preferably about 0.5 to 500 mPa·s.

Examples of such organohydrogenpolysiloxane of the component (B) include 1,1,3,3-tetramethyldisiloxane, 1,3,5,7-tetramethylcyclotetrasiloxane, tris(hydrogendimethylsiloxy)methylsilane, tris(hydrogendimethylsiloxy)phenylsilane, methylhydrogencyclopolysiloxane, methylhydrogensiloxane-dimethylsiloxane cyclic copolymer, methylhydrogenpolysiloxane having opposite ends of the molecular chain capped with trimethylsiloxy group,
dimethylsiloxane-methylhydrogensiloxane copolymer having opposite ends of the molecular chain capped with trimethylsiloxy group,
dimethylsiloxane-methylhydrogensiloxane-methylphenylsiloxane copolymer having opposite ends of the molecular chain capped with trimethylsiloxy group,
dimethylsiloxane-methylhydrogensiloxane-diphenylsiloxane copolymer having opposite ends of the molecular chain capped with trimethylsiloxy group,
methylhydrogenpolysiloxane having opposite ends of the molecular chain capped with dimethylhydrogensiloxy group,
dimethylpolysiloxane having opposite ends of the molecular chain capped with dimethylhydrogensiloxy group,
dimethylsiloxane-methylhydrogensiloxane copolymer having opposite ends of the molecular chain capped with dimethylhydrogensiloxy group,
dimethylsiloxane-methylphenylsiloxane copolymer having opposite ends of the molecular chain capped with dimethylhydrogensiloxy group, dimethylsiloxane-diphenylsiloxane copolymer having opposite ends of the molecular chain capped with dimethylhydrogensiloxy group, methylphenylpolysiloxane having opposite ends of the molecular chain capped with dimethylhydrogensiloxy group, diphenylpolysiloxane having opposite ends of the molecular chain capped with dimethylhydrogensiloxy group, any of such compounds having a part or all of the methyl group substituted with an alkyl group other than the methyl group such as ethyl group or propyl group;

an organosiloxane copolymer consisting of the siloxane unit represented by the formula: $R^3{}_2SiO_{0.5}$, the siloxane unit represented by the formula: $R^3{}_2HSiO_{0.5}$, and the siloxane unit represented by the formula: $SiO_2$;

an organosiloxane copolymer consisting of the siloxane unit represented by the formula: $R^3{}_2HSiO_{0.5}$ and the siloxane unit represented by the formula: $SiO_2$;

an organosiloxane copolymer consisting of the siloxane unit represented by the formula: $R^3HSiO$ and the siloxane unit represented by the formula: $R^3SiO_{1.5}$ or the siloxane unit represented by the formula: $HSiO_{1.5}$; and a mixture of two or more such organopolysiloxane. In the formulae as mentioned above, $R^3$ is a monovalent hydrocarbon group other than the alkenyl group, and the examples are as mentioned above.

The component (B) may be added at an amount such that the hydrogen atom bonded to the silicon atom in the component (B) is at 1 to 10 mole (or molecules), and in particular at 1 to 5 mole (or molecule) in relation to one mole (or molecule) of the alkenyl group bonded to the silicon atom in the component (A). When the amount of the hydrogen atom bonded to the silicon atom is less than 1 mole in relation to one mole of the alkenyl group bonded to the silicon atom in the component (A), curing of the composition will be insufficient, and amount in excess of 10 mole will invite markedly reduced heat resistance of the silicone rubber.

The organohydrogenpolysiloxane of component (B) may comprise one type or two or more types of the organohydrogenpolysiloxane.

The addition catalyst of the component (C) is not particularly limited as long as it promotes addition reaction by hydrosilylation between the alkenyl group bonded to the silicon atom in the component (A) and the SiH group in the component (B). Exemplary such catalysts include platinum group metals and their compounds such as platinum, palladium, rhodium, and the like; chloroplatinic acid, alcohol-modified chloroplatinic acid, or chloroplatinic acid coordinated with an olefin, vinylsiloxane, or acetylene compound; tetrakis(triphenylphosphine) palladium and chlorotris(triphenylphosphine) rhodium. The most preferred are platinum group metal compounds.

The addition catalyst may be added at an effective amount (or at a so called catalytic amount), and typically, at weight in terms of the catalyst metal element of 0.5 to 1,000 ppm, more preferably at 1 to 500 ppm, and more preferably at 10 to 100 ppm in relation to the total weight of the components (A) and (B). Addition at an excessively low content will result in the markedly retarded addition reaction or failure of curing, whereas excessive addition may be uneconomical due to the increased cost.

The optionally added fine powder silica of the component (D) functions as a reinforcing agent by imparting high tear strength to the cured product of the composition of the present invention. The use of the fine powder silica as the reinforcing agent enables formation of a coating film having excellent tear strength.

The fine powder silica of component (D) has a specific surface area of at least 50 m²/g, preferably 50 to 400 m²/g, and most preferably 100 to 300 m²/g. When the specific surface area is within such range, the resulting cured product is readily imparted with an excellent tear strength property. The specific surface area may be measured by BET method.

The fine powder silica of the component (D) may be any of the conventional reinforcement fillers that have been used for a silicone rubber as long as the specific surface area is within such range. Examples of such fine powder silica include fumed silica (dry silica) and precipitated silica (wet silica), and the precipitated silica may have a Na ion content in terms of $Na_2O$ of up to 0.35% by weight.

The fine powder silica of the component (D) may comprise one type or two or more types of the fine powder silica.

The fine powder silica may be used with no further processing. However, the fine powder silica may preferably have its surface hydrophobicized by using a surface treating agent such as organosilicon compound, for example, methylchlorosilanes such as trimethylchlorosilane, dimethyldichlorosilane, and methyltrichlorosilane; dimethylpolysiloxane; hexaorganodisilazane such as hexamethyldisilazane, divinyltetramethyldisilazane, and dimethyltetravinyldisilazane to thereby facilitate provision of the composition of the present invention with more favorable flowability, and also, to thereby enable its use as a hydrophobic fine powder silica. The surface hydrophobicization treatment may also be carried out by preliminarily mixing the one or more fine powder silica with the one or more surface treating agent with or without heating, or alternatively, the surface treatment may be carried out by similar treatment in the mixing of the components of the composition containing the alkenyl group-containing organopolysiloxane of the component (A) with the fine powder silica.

The component (D) may be added at an amount of up to 50 parts by weight (namely, at 0 to 50 parts by weight) in relation to 100 parts by weight of the organopolysiloxane of the component (A). Addition at an amount in excess of 50 parts by weight may easily result in the decrease of flowability of the composition, and hence, loss of workability in the coating. The amount added is preferably 0.1 to 50 parts by weight, more preferably 1 to 50 parts by weight, and most preferably 5 to 40 parts by weight. When added at an amount in such range, the cured product of the composition of the present invention is easily provided with particularly preferable high tear strength.

The component (E) is an organometallic compound selected from either one or both of titanium compounds and zirconium compounds, and these components functions as a condensation co-catalyst for promoting the adhesion. Examples of such component (F) include titanium condensation co-catalysts, for example, organotitanate esters such as tetraisopropyl titanate, tetrabutyl titanate, and titanium tetra (2-ethylhexoxide); and organotitanium chelate compounds such as diisopropoxy titanium (acetylacetonate), diisopropoxy titanium (ethylacetoacetonate), tetraacetyl titanium acetonate, and tetraacetyl titanium acetate; and zirconium condensation co-catalysts, for example, organozirconium esters such as zirconium tetrapropylate and zirconium tetrabutylate; organozirconium chelates such as zirconium tributoxyacetylacetonate, zirconium butoxyacetylacetonate bisethylacetoacetonate, and zirconium tetraacetylacetonate; and oxozirconium compounds such as zirconium bis(2-ethylhexanoate)oxide, and zirconium acetylacetonate(2-ethylhexanoate)oxide.

The component (E) may be incorporated at 0.01 to 5 parts by weight, and preferably 0.1 to 2 parts by weight in relation to 100 parts by weight of the component (A). Adhesion and sealing properties are lost at less than 0.01 part by weight, while incorporation in excess of 5 parts by weight results in the loss of the heat resistance of the cured product.

In the production method of the present invention, the liquid silicone rubber coating composition comprising the components (A) to (E) may further comprise any of the regulator compounds known in the art which are known to have an anti-addition catalyst effect of suppressing the curing as an optional component other than the components (A) to (E). Exemplary such compounds include phosphorus-containing compounds such as triphenylphosphine, nitrogen-containing compounds such as tributylamine, tetramethylethylenediamine, and benzotriazole, sulfur-containing compounds, acetylene compounds such as ethynylcyclohexanol, compounds containing two or more alkenyl groups, hydroperoxy compounds, and maleic acid derivatives. The cure retarding effects of the regulator compound greatly differ by the chemical structure of the regulator compound, and therefore, amount of the regulator compound added is preferably adjusted to the optimal amount of each regulator compound actually used in the process. Addition at an excessively small amount may result in the loss of long term storage stability at room temperature while excessive addition may adversely affect the curing.

Exemplary such other optional components include inorganic fillers such as crystalline silica, hollow filler, silsesquioxane, fumed titanium dioxide, magnesium oxide, zinc oxide, iron oxide, aluminum hydroxide, magnesium carbonate, calcium carbonate, zinc carbonate, layered mica, carbon black, diatomaceous earth, and glass fiber; and fillers prepared by treating the surface of any one of such inorganic filler with an organosilicon compound such as organoalkoxysilane compound, organochlorosilane compound, organosilazane compound, or low molecular weight siloxane compound; as well as silicone rubber powders and silicone resin powders.

The composition may also contain other optional components at an amount not adversely affecting the merits of the present invention. Exemplary such optional components include a non-functional organopolysiloxane not containing hydrogen atom or alkenyl group bonded to the silicon atom, organic solvent, anti-creep hardening agent, plasticizer, thixotropic agent, pigment, dye, and fungicide.

In the present invention, the component (F) as described above is used for the preliminary treatment of the textile fabric used for the substrate of an air bag separately from the liquid silicone rubber coating composition containing the components (A) to (E). Direct incorporation of the component (F) in the liquid silicone rubber coating composition containing the components (A) to (E) invites marked thickening of the composition, and this results in the loss of workability and stability of the coating required in the formation of the thin film coating layer having consistent thickness. In addition, sufficient adhesion is realized only by increasing the amount of the component (F), and this is disadvantageous in view of the cost.

The liquid silicone rubber coating composition used in the present invention can be prepared by mixing the components as described above according to the method commonly used in the art. While the viscosity of the composition is not particularly limited, a low viscosity is preferable in view of the workability and stability of the coating. The viscosity is typically up to 50 Pa·s (for example, 1 to 50 Pa·s), preferably 10 to 50 Pa·s, and more preferably 20 to 50 Pa·s at 25° C.

The thus obtained liquid silicone rubber coating composition has the low viscosity and excellent adhesion to the air bag base fabric required for the air bag coating, and therefore, this coating composition is well adapted for use in producing an air bag which should retain the inflated state for a predetermined period for head protection and prevention of being thrown out of the car in the collision and roll-over accidents.

A silicone rubber-coated base fabric for air bag can be produced by coating the liquid silicone rubber coating composition on at least one treated surface, and in particular on the treated one surface of the substrate comprising the textile fabric preliminarily surface treated with the component (F), heating and curing the coating in a hot air dryer to form a silicone rubber coating layer.

The method used for coating the composition may be a method commonly used in the art, and the composition is preferably coated to a thickness (or a coating weight) of, for example, about 10 to 150 g/m$^2$, preferably about 15 to 80 g/m$^2$, and more preferably about 20 to 60 g/m$^2$.

The method and condition used for the curing of the coating composition may be those known in the art, and the curing is typically conducted at 120 to 180° C. for 1 to 10 minutes.

EXAMPLES

Next, the present invention is described in detail by referring to the Examples and Comparative Examples which by no means limit the scope of the present invention. In the following Examples and Comparative Examples, viscosity is the one measured by a rotary viscometer at 25° C.

Example 1

65 parts by weight of dimethylpolysiloxane having opposite ends of the molecular chain capped with vinyldimethylsiloxy group and having a viscosity at 25° C. of about 30,000 mPa·s; 8 parts by weight of hexamethyldisilazane, 2 parts by weight of water, and 40 parts by weight of wet silica having a specific surface area as measured by BET method of about 200 m$^2$/g (precipitated silica with the product name of Nipsil (registered trademark) LP having Na ion content (as Na$_2$O) of 0.30% by weight manufactured by Tosoh Silica Corporation) were introduced in a kneader at room temperature, and stirred for 1 hour. The resulting mixture was heated to 150° C. and the stirring was continued for another 2 hours. After cooling the mixture to room temperature, 19 parts by weight of dimethylpolysiloxane having opposite ends of the molecular chain capped with vinyldimethylsiloxy group, and 5 parts by weight of dimethylpolysiloxane containing 5% by mole of vinylmethylsiloxane unit in relation to the entire diorganosiloxane unit in the backbone, having opposite ends of the molecular chain capped with trimethylsiloxy group, and having a viscosity at 25° C. of about 700 mPa·s were added to this mixture, and the mixture was stirred until the mixture was homogeneous. The base compound (I) was thereby obtained.

78 parts by weight of the base compound (I) was then mixed with 35 parts by weight of dimethylpolysiloxane having opposite ends of the molecular chain capped with vinyldimethylsiloxy group and having a viscosity of about 5,000 mPa·s; 15 parts by weight of dimethylpolysiloxane having opposite ends of the molecular chain capped with vinyldimethylsiloxy group and having a viscosity at 25° C. of about 1,000 mPa·s; 10 parts by weight of organopolysiloxane resin having a three dimensional network structure consisting of 39.5% by mole of $(CH_3)_3SiO_{1/2}$ unit, 6.5% by mole of $(CH_3)_2(CH_2\!=\!CH)SiO_{1/2}$ unit, and 54% by mole of $SiO_2$ unit; 6.4 parts by weight of dimethylsiloxane-methylhydrogensiloxane copolymer having opposite ends of the molecular chain capped with trimethylsiloxy group and having hydrogen atom bonded to the silicon atom at the side chain of the molecular chain (having a content of the hydrogen atom bonded to the silicon atom of 1.08% by weight), and having a viscosity at 25° C. of 45 mPa·s; 0.09 part by weight of 1-ethynylcyclohexanol, 0.38 part by weight of dimethylpolysiloxane solution containing chloroplatinic acid/1,3-divinyltetramethyldisiloxane complex at a content in terms of the platinum atom content of 1% by weight; and 0.2 part by weight of titanium tetra(2-ethylhexoxide) to prepare composition A (wherein molar ratio of the alkenyl group bonded to the silicon atom to the hydrogen atom bonded to the silicon atom in the composition is 5.5).

In the meanwhile, nylon 66 textile fabric was immersed in 1% by weight aqueous solution of γ-glycidoxypropyltrimethoxysilane, so that the weight of the nylon 66 textile fabric was equal to the weight of 1% by weight aqueous solution of γ-glycidoxypropyltrimethoxysilane, and after heating at 120° C. for 2 minutes, an air bag base fabric A containing about 1% by weight of γ-glycidoxypropyltrimethoxysilane was prepared.

Viscosity of the composition A was measured by using a rotary viscometer BH-7-20. The results are shown in Table 1. The composition A was also coated on the air bag base fabric A (80 g/m$^2$), and cured by heating at 170° C. for 1 minute. The resulting coated fabric was evaluated for the adhesion by Scott crease flex test. The results are also shown in Table 1.

[Viscosity Measurement]

Viscosity measurement was conducted by using rotary viscometer BH-7-20.

Pass: the composition was evaluated "pass" when the viscosity was up to 50 Pa·s in view of stability and workability of in the coating.

Fail: the composition was evaluated "fail" when the viscosity was in excess of 50 Pa·s.

[Scott Crease Flex Test]

Scott crease flex test was conducted by using a crease flex tester. The coated fabric was subjected to 500 cycles of the crease flex test by pressing at a pressure of 2 kgf, and peeling of the silicone rubber coating thin film from the base fabric was observed with naked eye. The evaluation was conducted by the following criteria. The results are shown in Table 1.

Pass: the composition was evaluated "pass" when peeling of the coating film from the base fabric was not observed.

Fail: the composition was evaluated "fail" when peeling of the coating film from the base fabric was observed.

Comparative Example 1

78 parts by weight of the base compound (I) prepared in Example 1 was mixed with 35 parts by weight of dimethylpolysiloxane having opposite ends of the molecular chain capped with vinyldimethylsiloxy group and having a viscosity of about 5,000 mPa·s; 15 parts by weight of dimethylpolysiloxane having opposite ends of the molecular chain capped with vinyldimethylsiloxy group and having a viscosity at 25° C. of about 1,000 m Pa·s; 10 parts by weight of organopolysiloxane resin having a three dimensional network structure consisting of 39.5% by mole of $(CH_3)_3SiO_{1/2}$ unit, 6.5% by mole of $(CH_3)_2(CH_2\!=\!CH)SiO_{1/2}$ unit, and 54% by mole of $SiO_2$ unit; 6.4 parts by weight of dimethylsiloxane-methylhydrogensiloxane copolymer having opposite ends of the molecular chain capped with trimethylsiloxy group and having hydrogen atom bonded to the silicon atom at the side chain of the molecular chain (having a content of the hydrogen atom bonded to the silicon atom of 1.08% by weight), and having a viscosity at 25° C. of 45 mPa·s; 0.09 part by weight of 1-ethynylcyclohexanol, 0.38 part by weight of dimethylpolysiloxane solution containing chloroplatinic acid/1,3-divinyltetramethyldisiloxane complex at a content in terms of the platinum atom content of 1% by weight; 0.2 part by weight of titanium tetra(2-ethylhexoxide); and 1 part by weight of γ-glycidoxypropyltrimethoxysilane to prepare composition B (wherein molar ratio of the alkenyl group bonded to the silicon atom to the hydrogen atom bonded to the silicon atom in the composition is 5.5).

The air bag base fabric prepared by using the nylon 66 textile fabric with no processing and not containing the γ-glycidoxypropyl trimethoxysilane was designated air bag base fabric B.

The preparation of the coated fabric and the evaluation were conducted by repeating the procedure of Example 1. The results are shown in Table 1. The composition of the Comparative Example 1 exhibited sufficient adhesion of the coating film to the base fabric while viscosity of the coating composition was too high, detracting from workability and stability in the coating.

Comparative Example 2

The preparation of the coated fabric and the evaluation were conducted by repeating the procedure of Example 1 by using the composition A prepared in Example 1 and the air bag base fabric B used in Comparative Example 1. The results are shown in Table 1. The composition of the Comparative Example 2 exhibited sufficient workability and stability in the coating while adhesion of the coating film to the base fabric was inferior.

TABLE 1

|  | Example 1 | Comparative Example 1 | Comparative Example 2 |
|---|---|---|---|
| Viscosity | Pass | Fail | Pass |
| Scott crease flex test | Pass | Pass | Fail |

The invention claimed is:

1. A method for producing an air bag base fabric comprising the steps of preliminarily treating at least one surface of a textile fabric composed of a polyamide fiber with (F) an organosilicon compound containing an epoxy group and an alkoxy group bonded to a silicon atom in one molecule to prepare a substrate which is an air bag textile fabric composed of the polyamide fiber and containing 0.01 to 5 parts by weight of the organosilicon compound in relation to 100 parts by weight of the textile fabric before the treatment, coating the at least one treated surface of the substrate with a liquid silicone rubber coating composition having a viscosity at 25° C. of up to 50 Pa·s comprising (A) 100 parts by weight of an organopolysiloxane containing at least 2 alkenyl groups bonded to silicon atoms per molecule, (B) an organohydrogenpolysiloxane containing at least 2 hydrogen atoms bonded to silicon atoms in one molecule at an amount such that the number of the hydrogen atoms bonded to the silicon atoms in this component is 1 to 10 per one alkenyl group bonded to the silicon atom in the component (A), (C) an effective amount of an addition catalyst,
(D) 0 to 50 parts by weight of a fine powder silica having a specific surface area of at least 50 $m^2/g$, and
(E) 0.01 to 5 parts by weight of an organometallic compound selected from titanium compounds and zirconium compounds,
but free of component (F), and
curing the composition to form a silicone rubber coating layer on at least one surface of the substrate.

2. A method for producing an air bag base fabric according to claim 1, wherein the organosilicon compound (F) containing an epoxy group and an alkoxy group bonded to a silicon atom in one molecule is a silane or a cyclic or straight chain organosiloxane containing 2 to 120 silicon atoms and containing at least 1 epoxy group and at least 2 alkoxy groups bonded to the silicon atoms.

3. An air bag base fabric produced by the method of claim 1, and having a silicone rubber coating layer formed by curing the liquid silicone rubber coating composition on at least one surface of the substrate comprising a textile fabric.

4. A method for producing an air bag base fabric according claim 1, wherein the polyamide fiber is selected from 6,6 nylon and 6 nylon.

5. A method for producing an air bag base fabric according to claim 1, wherein (D) the fine powder silica is a precipitated silica having an Na ion content in terms of $Na_2O$ of up to 0.35% by weight.

* * * * *